(12) United States Patent
Tione

(10) Patent No.: US 11,851,040 B2
(45) Date of Patent: *Dec. 26, 2023

(54) ELECTRONIC CONTROL SYSTEM OF THE BRAKING OF A RAILWAY VEHICLE

(71) Applicant: FAIVELEY TRANSPORT ITALIA S.P.A., Piossasco (IT)

(72) Inventor: Roberto Tione, Lauriano (IT)

(73) Assignee: FAIVELEY TRANSPORT ITALIA S.P.A., Piossasco (IT)

( * ) Notice: Subject to any disclaimer, the term of this patent is extended or adjusted under 35 U.S.C. 154(b) by 256 days.

This patent is subject to a terminal disclaimer.

(21) Appl. No.: 17/321,314

(22) PCT Filed: Nov. 14, 2019

(86) PCT No.: PCT/IB2019/059778
§ 371 (c)(1),
(2) Date: May 14, 2021

(87) PCT Pub. No.: WO2020/100076
PCT Pub. Date: May 22, 2020

(65) Prior Publication Data

US 2023/0138260 A1     May 4, 2023

(30) Foreign Application Priority Data

Nov. 15, 2018   (IT) .......................... 102018000010349

(51) Int. Cl.
*G05D 1/00*     (2006.01)
*B60T 8/17*     (2006.01)
(Continued)

(52) U.S. Cl.
CPC .......... *B60T 8/1705* (2013.01); *B60T 8/3235* (2013.01); *B60T 8/94* (2013.01)

(58) Field of Classification Search
CPC ........ B60T 8/1705; B60T 8/3235; B60T 8/94; B60T 13/683; G05D 1/00
(Continued)

(56) References Cited

U.S. PATENT DOCUMENTS 3,970,348 A * 7/1976 Maskery ................. B60T 8/266
303/22.7
4,145,091 A * 3/1979 Bueler ...................... B60T 8/38
303/118.1
(Continued)

FOREIGN PATENT DOCUMENTS

CN     104129380 A    11/2014
CN     107667045 A     2/2018
(Continued)

OTHER PUBLICATIONS

Japanese Patent Office, Office Action Issued in Application No. 2021-526442, dated Nov. 22, 2022, 6 pages. (Submitted with Partial Translation).
(Continued)

*Primary Examiner* — Shardul D Patel
(74) *Attorney, Agent, or Firm* — McCoy Russell LLP

(57) ABSTRACT

An electronic control system of the braking of a railway vehicle includes an emergency braking module which generates a respective intermediate braking pressure signal indicative of an emergency braking and a service braking module which generates a respective service braking pressure signal; the emergency braking module is arranged to: generate a braking pressure control signal corresponding to the service braking pressure signal, when the higher among the one or more intermediate braking pressure signals indicative of an emergency braking is lower than a threshold; generate a braking pressure control signal corresponding to the higher among the one or more intermediate braking pressure signals indicative of an emergency braking,
(Continued)

when the higher among the one or more intermediate signals braking pressure indicative of emergency braking is equal or higher than the threshold; and convert the braking pressure control signal by an electropneumatic actuator.

19 Claims, 9 Drawing Sheets

(51) Int. Cl.
    *B60T 8/32*     (2006.01)
    *B60T 8/94*     (2006.01)

(58) Field of Classification Search
    USPC .......................................................... 701/19
    See application file for complete search history.

(56) References Cited

U.S. PATENT DOCUMENTS

| | | | |
|---|---|---|---|
| 5,791,744 A | 8/1998 | Wood et al. | |
| 2004/0046442 A1* | 3/2004 | Aurich | B60T 17/20 |
| | | | 303/7 |
| 2015/0037071 A1* | 2/2015 | Yamamoto | G03G 15/0879 |
| | | | 399/258 |
| 2015/0367822 A1* | 12/2015 | Jennek | B60T 17/228 |
| | | | 701/70 |
| 2018/0354479 A1* | 12/2018 | Mauder | B60T 13/683 |
| 2019/0248389 A1* | 8/2019 | Engelland | B60T 13/10 |
| 2019/0312781 A1* | 10/2019 | Kafzan | G06F 21/57 |
| 2020/0031330 A1* | 1/2020 | Tione | B60T 13/68 |

FOREIGN PATENT DOCUMENTS

| | | | |
|---|---|---|---|
| CN | 108394408 A | 8/2018 | |
| CN | 208021476 U | 10/2018 | |
| DE | 102008045712 A1 | 4/2011 | |
| DE | 102013201630 A1 | 7/2014 | |
| JP | 2003072537 A | 3/2003 | |
| JP | 2015514623 A | 5/2015 | |
| WO | 2006113954 A1 | 11/2006 | |
| WO | 2013144543 A2 | 10/2013 | |
| WO | WO-2016075642 A1 * | 5/2016 | ............ B60T 13/665 |
| WO | 2017109690 A1 | 6/2017 | |
| WO | 2017175108 A1 | 10/2017 | |
| WO | 2018189693 A1 | 10/2018 | |

OTHER PUBLICATIONS

ISA European Patent Office, Written Opinion of the International Searching Authority Issued in Application No. PCT/IB2019/059778, dated Feb. 2, 2020, WIPO, 5 pages.

SA European Patent Office, International Search Report Issued in Application No. PCT/IB2019/059778, dated Feb. 2, 2020, WIPO, 3 pages.

* cited by examiner

ELECTRONIC CONTROL SYSTEM OF THE BRAKING OF A RAILWAY VEHICLE

CROSS REFERENCE TO RELATED APPLICATIONS

The present application is a U.S. National Phase of International Application No. PCT/IB2019/059778 entitled "ELECTRONIC CONTROL SYSTEM OF THE BRAKING OF A RAILWAY VEHICLE," and filed on Nov. 14, 2019. International Application No. PCT/IB2019/059778 claims priority to Italian Patent Application No. 102018000010349 filed on Nov. 15, 2018. The entire contents of each of the above-listed applications are hereby incorporated by reference for all purposes.

TECHNICAL FIELD

The present invention generally relates to the field of railway braking systems; in particular, the invention relates to a braking control system for a railway vehicle.

BACKGROUND AND SUMMARY

Conventional railway braking systems perform different functions characterized by the state in which the railway vehicle is. The two main functions are known as "service braking" and "emergency braking".

Service braking is the state in which the railway vehicle is decelerated during the normal steps of the operational service. In this state, the braking performance must be guaranteed with a probability of failure of less than $10^{-7}$. This value corresponds to the Safety Integrity Level SIL2 referred to the EN50126 standard.

Emergency braking is the state in which the train must guarantee braking within a stopping distance established by international standards, with a probability of not reaching the performance typically equal to or less than $10^{-9}$. This value corresponds to the Safety Integrity Level SIL4 of the EN50126 standard.

As far as the implementation of the service braking is concerned, the braking systems relating to railway vehicles are now entirely managed by electronic controls interacting with the control systems of the traction motors, used in a regenerative manner during braking (electrodynamic brake), and with TCMS, "Train Control and Monitoring Systems", for a continuous exchange of diagnostic information and real-time management of compensation modes for possible malfunctions of the service brake system or electrodynamic brake.

Such an embodiment using electronic systems has considerably increased passenger comfort, for example by ensuring tolerable acceleration variations or by dynamically compensating for the variation in friction coefficients of the friction materials with varying speed, while maintaining uniform deceleration.

On the other hand, these electronic service braking control systems have become increasingly complex, based on microprocessor architectures carrying large amounts of software code linked not only to real-time processes for managing the brake, but also to the management of diagnostic processes of the complete braking system and the management of complex communication protocols, such as Ethernet or MVB. For this reason, the main operators in the sector prefer to use purely pneumatic solutions during the emergency braking step.

The emission of the EN16185 railway standard is proof of this. This standard standardizes the braking systems that provide two competing pneumatic channels for requesting emergency braking.

The reason for this choice by operators is linked to the intrinsic high safety coefficient and reliability demonstrated over time by the pneumatic architectures and the pneumatic components used, against the lower reliability of electronic systems. The lower reliability is mainly linked to the potential presence of common mode software defects that can occur simultaneously on the entire train during emergency braking, partially or totally compromising the achievement of stopping distances.

However, this technological choice is starting to come into conflict with the increasing demands for accuracy in stopping distances during emergency braking.

The pneumatic systems and components are subject to inaccuracies caused by the dependence on the temperature of the springs and the rubber subcomponents and their aging.

The further European standard EN15611 imposes stringent limits on the tolerances of the aforementioned pneumatic systems and components, such as to make them difficult to achieve and of extremely high cost.

An example of a pneumatic braking system integrating service braking and emergency braking, known to the man skilled in the art, is shown in FIG. 1.

The pressure in the general pipeline 101 is modulated by the brake tap 102 in a variable range of pressures between 5 bar and 3.5 bar, in which 5 bar is the value representing a zero braking request and the value of 3.5 bar representing the maximum service braking.

An emergency button 103 discharges the general pipeline below values lower than 3.5 bar representing the emergency braking request. A distributor valve 104 modulates the pressure at its outlet as a function of the pressure in the general pipeline 101, according to the diagram shown in FIG. 2A.

For a general pipeline pressure value equal to 5 bar, the outlet pressure to the distributor valve 104 is zero, and corresponds to a zero braking request.

For pressure values in the general pipeline between 5 bar and 3.5 bar, the outlet valve pressure varies linearly between 0 bar and 3.8 bar; 3.8 bar being the pressure value corresponding to the emergency braking.

For general pipeline pressures below 3.5 bar, the outlet valve pressure remains at 3.8 bar, or at the pressure value corresponding to the emergency braking.

The emergency button 103 has the purpose of discharging the general pipeline bringing the pressure below the value of 3.5 bar much faster than the brake tap, accelerating the passage from the state of service braking to the state of emergency braking.

The empty-load valve 105, also known to experts as VCAV, from the French definition "Vide-Chargè Auto-Variable", has the purpose of correcting the pressure sent to the brake cylinder 106 according to the weight bearing on the vehicle, according to the feature shown in FIG. 2B.

The purpose of the latter function is to limit the pressure according to the available adhesion considered in the vehicle design phase, in other words, to provide the maximum possible braking pressure beyond which the available grip force would be exceeded. Overcoming the available adhesion force would cause the axes to lock with consequent wheel flatness and loss of braking force due to the transition from the rolling friction to the creeping friction of the wheels themselves.

The distributor valve 104 and the empty-load valve 105, respectively schematized in FIG. 3 and FIG. 4, are extremely complex pneumatic components.

In particular, with each new application, the empty-load valve 105 requires the redesign of the internal parts, such as for example the loading of the springs or the ratio of the platform scale, having to readjust to the new weight ranges between tare and full load of the vehicle and of the adhesion available for the application itself.

Furthermore, it is usual to have different configurations of sub-components of the empty-load valves 105 for the same train at the varying of the tare-full load interval between the various vehicles constituting the train itself, for example between motor cars and trailer cars.

Finally, during the train commissioning step, continuous recalibration requests involve frequent replacement of the sub-components themselves, until a correct configuration is reached.

The implementation of electronic systems for railway applications is currently regulated by the following European railway standards:

EN50126 "Railway applications. The specification and demonstration of reliability, availability, maintainability and safety (RAMS). Basic requirements and generic process";

EN50128 "Railway applications—Communications, signaling and processing systems—Software for railway control and protection systems";

EN50129 "Railway applications. Communication, signaling and processing systems. Safety related electronic systems for signaling".

In particular, the EN50126 standard defines the methodology for assigning the SIL0/1/2/3/4 safety levels to the subsystems based on the results of the Safety Analysis, and the EN50128 and EN50129 standards define the design criteria to be applied to the Software and Hardware components respectively based on the assigned SIL levels.

Based on the application of the previously cited standards, the following statements and concepts can be expressed:

electronic systems used for the realization of the service braking function can generally be made according to the provisions dictated by the aforementioned standards, limiting said realization to safety levels not higher than SIL2;

electronic systems used for the realization of the emergency braking function can be made according to the prescriptions dictated by the aforementioned rules, restricting said realization to safety levels not lower than SIL3.

It is prior art to make electronic systems compliant with SIL levels≤2 for service braking control; on the contrary, it is very complex and burdensome to develop and maintain electronic systems that comply with SIL levels≥3.

The ratio of development complexity and cost to certification between SIL systems≤2 and SIL systems≥3 typically ranges between 1:20 and 1:40.

In addition, Notified Bodies for Safety and National Safety Agencies neither accept the coexistence of software modules developed at different SIL levels executed by the same Hardware architecture, nor SIL level software modules≥3 executed by SIL hardware architectures≤2 for electronic architectures that must reach an overall SIL level≥3.

It is therefore evident that the development of single electronic architectures that can simultaneously provide the service braking function, the emergency braking function, the diagnostic functions, other functions is not convenient, as these architectures should be implemented according to SIL levels≥3 in their entirety, with high expenditure of economic resources and long development time.

Patent WO2018189693 proposes a solution to the aforementioned problem claiming an electronic control system for emergency and service braking for a railway vehicle designed to generate a braking pressure corresponding to the greater between a service braking pressure signal, coming from a service braking module, and an emergency braking pressure signal.

However, the solution proposed by WO2018189693 does not cover cases in which the skid control system is deactivated during emergency braking.

As described above, emergency braking requires compliance with overall SIL4 safety levels in accordance with EN50126. As a consequence, it is known that generally the devices which contribute to the achievement of the emergency braking, if developed through electronic technology, must be subjected to safety levels SIL≥3 according to the EN50128 and EN50129 standards.

Modern anti-skid systems use very complex algorithms, for example as described in EP3393873, WO2017175108 and EP1874601, which are difficult to achieve by adopting the methods recommended by the EN50128 standard, safety levels SIL≥3. This implies the request by some European Railway Safety Agencies to inhibit anti-skid devices during emergency braking, despite the fact that these anti-skid devices could contribute to reducing the stopping distances in the event of degraded grip.

In this configuration, it is chosen to reduce the emergency braking pressure by accepting a greater stopping distance with respect to the service braking, in order to reduce the risk of triggering of skidding which due to the inhibition of the anti-skid system would lead to the inevitable locking of the wheels.

Patent WO2018189693, proposing to always implement the higher between the service braking pressure and the emergency braking pressure, could in certain cases not comply with the requirement to apply an emergency braking pressure lower than the service braking pressure.

An object of the present invention is therefore to provide an electronic braking control system for a railway vehicle that allows the emergency braking function to be segregated and made independent of the service braking function and the other accessory functions, guaranteeing total isolation of parts conforming to SIL levels≥3 from parts conforming to SIL levels≤2, while making the realization of the braking pressures converge on a single common actuator, thus reducing the development, installation and maintenance cost of a completely electronic railway braking control system.

Clearly, the control of the railway vehicle braking concerns both the control of the service braking and the control of the emergency braking.

Furthermore, the control system favors the application of emergency braking pressure during emergency braking request.

The above and other objects and advantages are achieved, according to an aspect of the invention, by an electronic control system of the braking of a railway vehicle having the features defined in the independent claims. Preferred embodiments of the invention are defined in the dependent claims.

BRIEF DESCRIPTION OF THE FIGURES

The functional and structural features of some preferred embodiments of an electronic braking control system of a railway vehicle according to the invention will now be described. Reference will be made to the accompanying drawings, in which.

DETAILED DESCRIPTION

Figure 1:
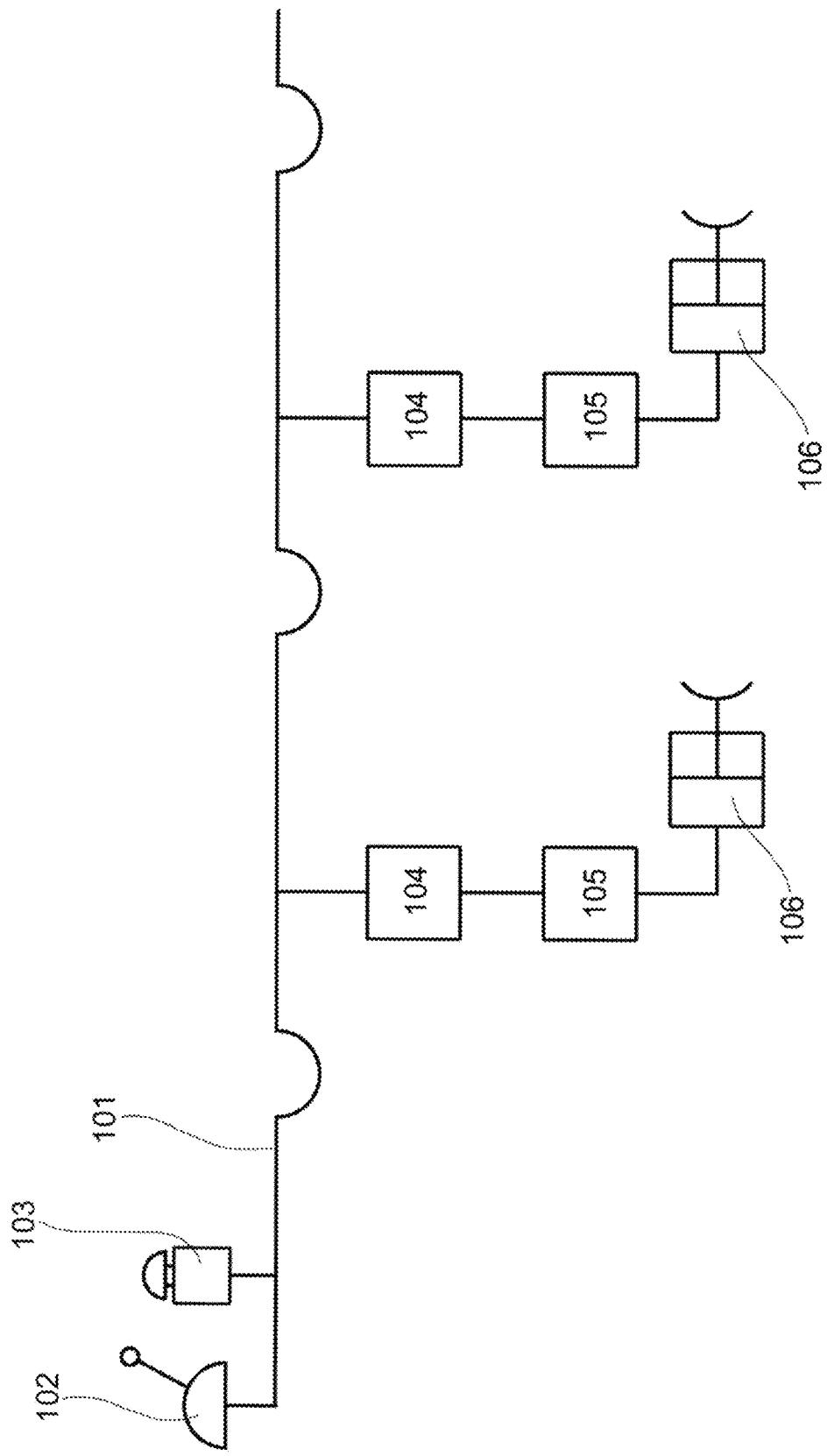
FIG. 1 illustrates in a simplified manner a pneumatic braking system integrating service and emergency braking, known to the man skilled in the art; for the purpose of simplification, the main and auxiliary tanks, as well as all the accessory functions not necessary for exemplification, are not shown.

Before explaining a plurality of embodiments of the invention in detail, it should be noted that the invention is not limited in its application to the construction details and to the configuration of the components presented in the following description or shown in the drawings. The invention can take other embodiments and be implemented or practically carried out in different ways. It should also be understood that the phraseology and terminology are for descriptive purpose and are not to be construed as limiting. The use of "include" and "comprise" and variations thereof are intended as including the elements cited thereafter and their equivalents, as well as additional elements and equivalents thereof.

Throughout the present description, the term "module" preferably refers to a module which can be implemented by means of an electronic hardware-software architecture, the term "submodule" preferably indicates a submodule inside which functions can be implemented, in turn implemented through software or hardware controlled by said software. The software can be run for example by microprocessors or by FPGA.

In the figures, the lines connecting the various submodules within a module should preferably be understood as electrical signals or software variables.

The electronic control system of the braking of a railway vehicle 500 according to the invention is characterized in that it includes an emergency braking module 501 (SAFETY BRAKE MODULE) and a service braking module 507 (SERVICE BRAKE MODULE) each including an electronic architecture arranged to generate a braking pressure value, said electronic architectures being independent and segregated from each other.

The service braking module 507 is arranged to receive at least a deceleration or service braking request signal 530 and to generate a respective service braking pressure signal 535. The emergency braking module 501 is connected to said service braking module 507 through a communication channel 536 for receiving said service braking pressure signal 535.

Said emergency braking module 501 is arranged to receive at least one signal indicative of an emergency braking request and to generate a respective intermediate braking pressure signal indicative of an emergency braking 523.

The emergency braking module 501 is also arranged to generate a braking pressure control signal 524 corresponding to the service braking pressure signal 535, when the higher among the one or more intermediate braking pressure signals indicative of an emergency braking 523, 605 is lower than a predetermined threshold pressure value 529.

The emergency braking module 501 is also arranged to generate a braking pressure control signal 524 corresponding to the higher among the one or more braking pressure signals indicative of an emergency braking 523, 605, when the higher among the one or more intermediate signals braking pressure indicative of emergency braking 523, 605 is equal or higher than the predetermined threshold pressure value 529.

Moreover, the emergency braking module 501 is also arranged to convert said braking pressure control signal 524 in a braking pressure by controlling an electropneumatic actuator 506.

Figure 5:
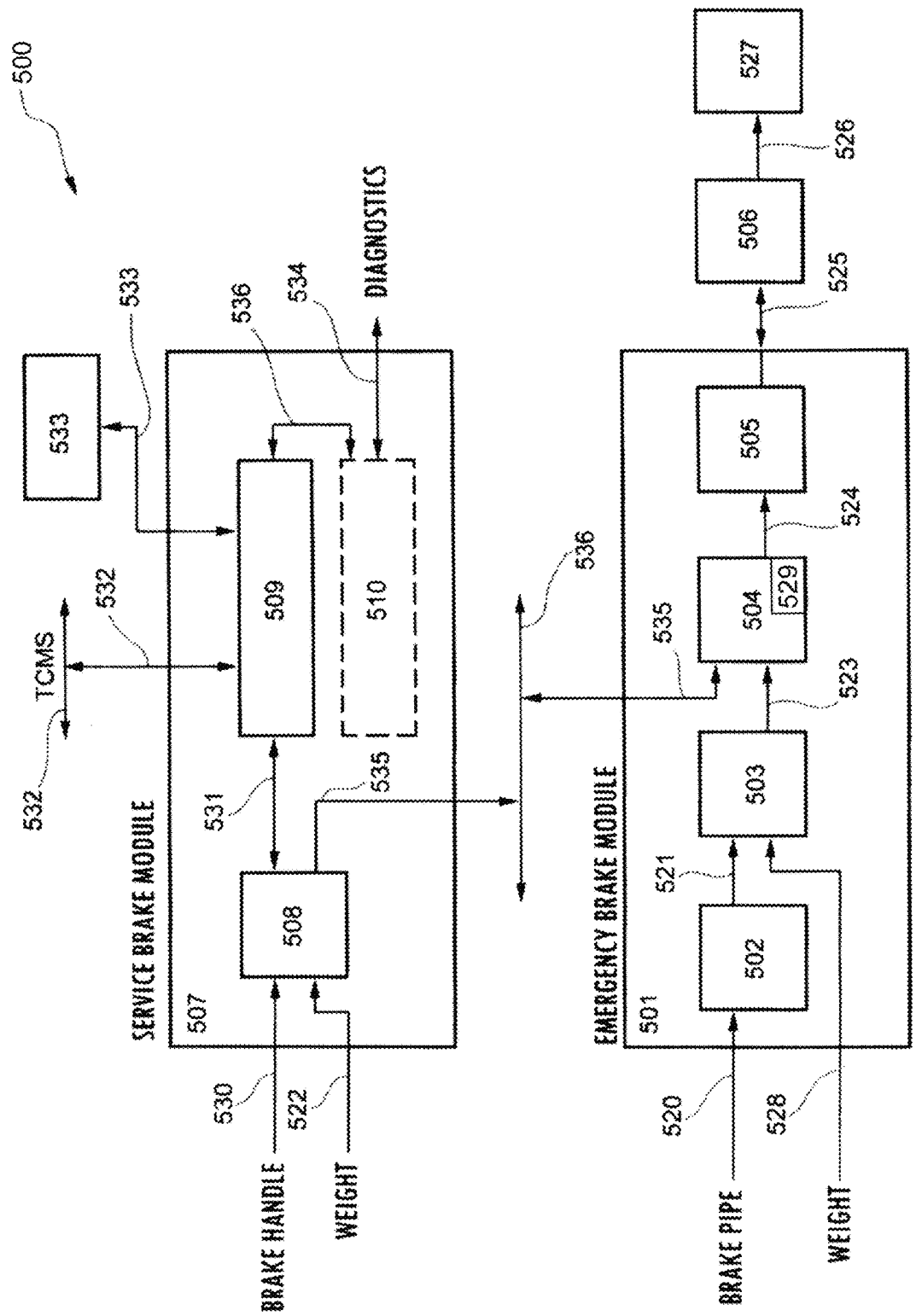
FIG. 5 illustrates an embodiment of an electronic braking control system for a railway vehicle.

In an embodiment shown in FIG. 5, the service braking module 507 includes a submodule for calculating a service braking pressure 508 which receives a service braking or deceleration request 530 generated for example by a manipulator of the brake (BRAKE HANDLE DEMAND) via a service braking or deceleration request signal 530, and the weight of the vehicle (WEIGHT) via a first weight signal 522.

Said first weight signal 522 being for example, but not exclusively, the acquired pressure value coming from the suspensions or an electrical voltage derived from a position sensor of the body with respect to the bogie.

The calculation submodule of a service braking pressure 508 performs in real time the calculation of a pressure value necessary for the service braking corresponding to the aforementioned service braking or deceleration request 530, and generates a respective service braking pressure signal 535 having a value corresponding to the pressure value necessary for the calculated service braking.

Figure 2A:
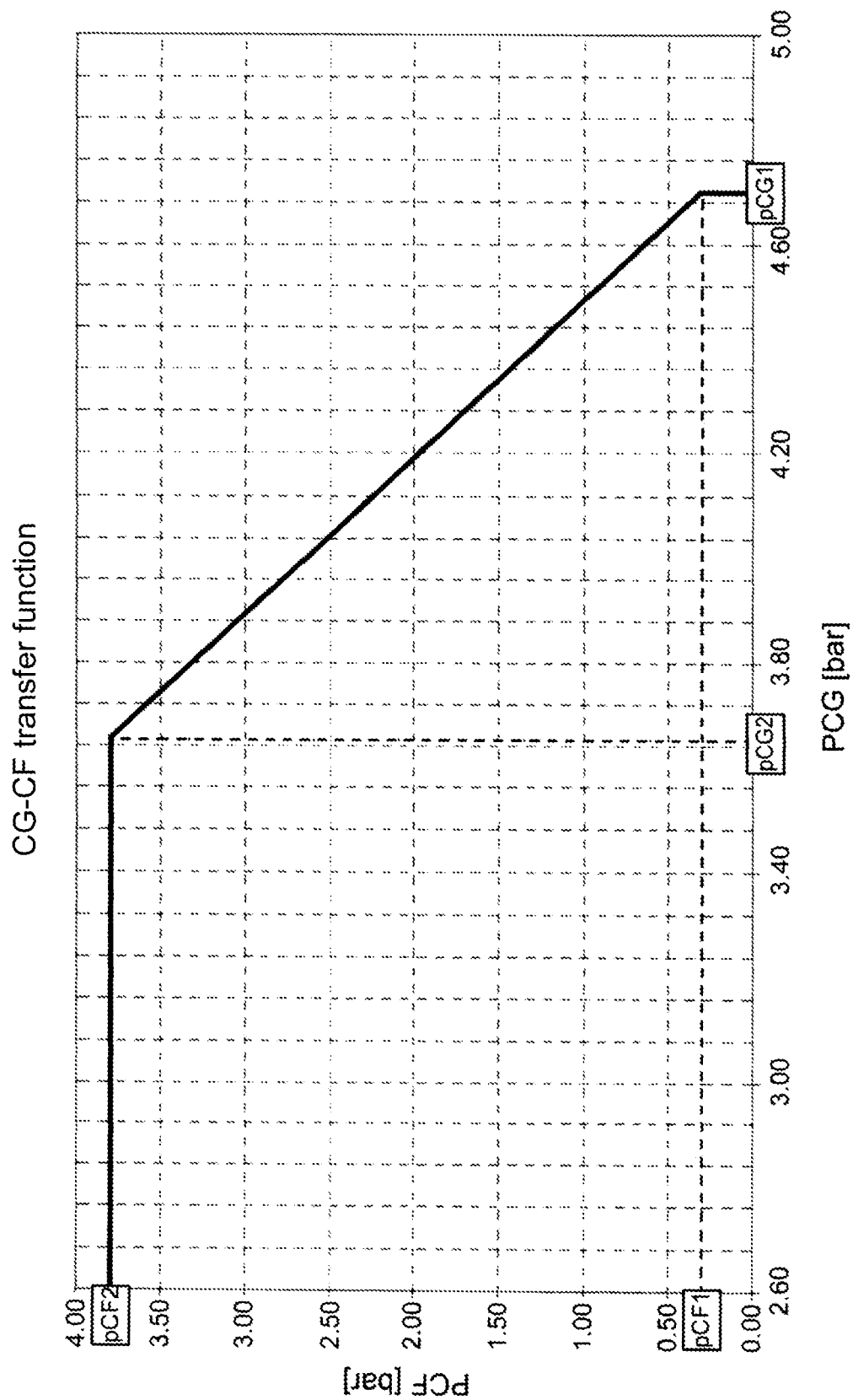
FIG. 2A illustrates the input-output transfer function of a distributor valve.
Figure 2B:
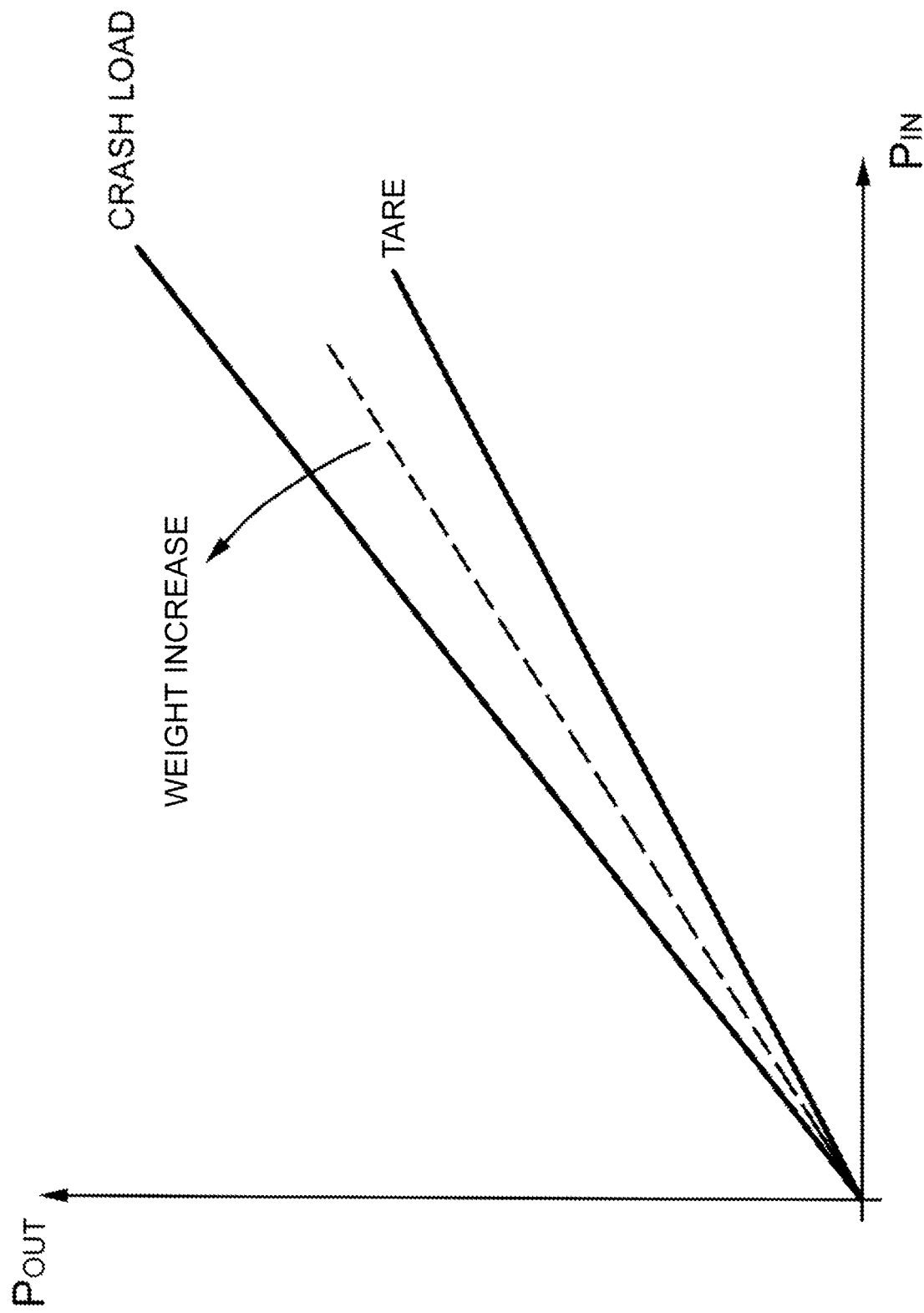
FIG. 2B illustrates a curve functionally emulating an empty-load valve 105, in which the term crash load indicates an unusual passenger load condition.
Figure 3:
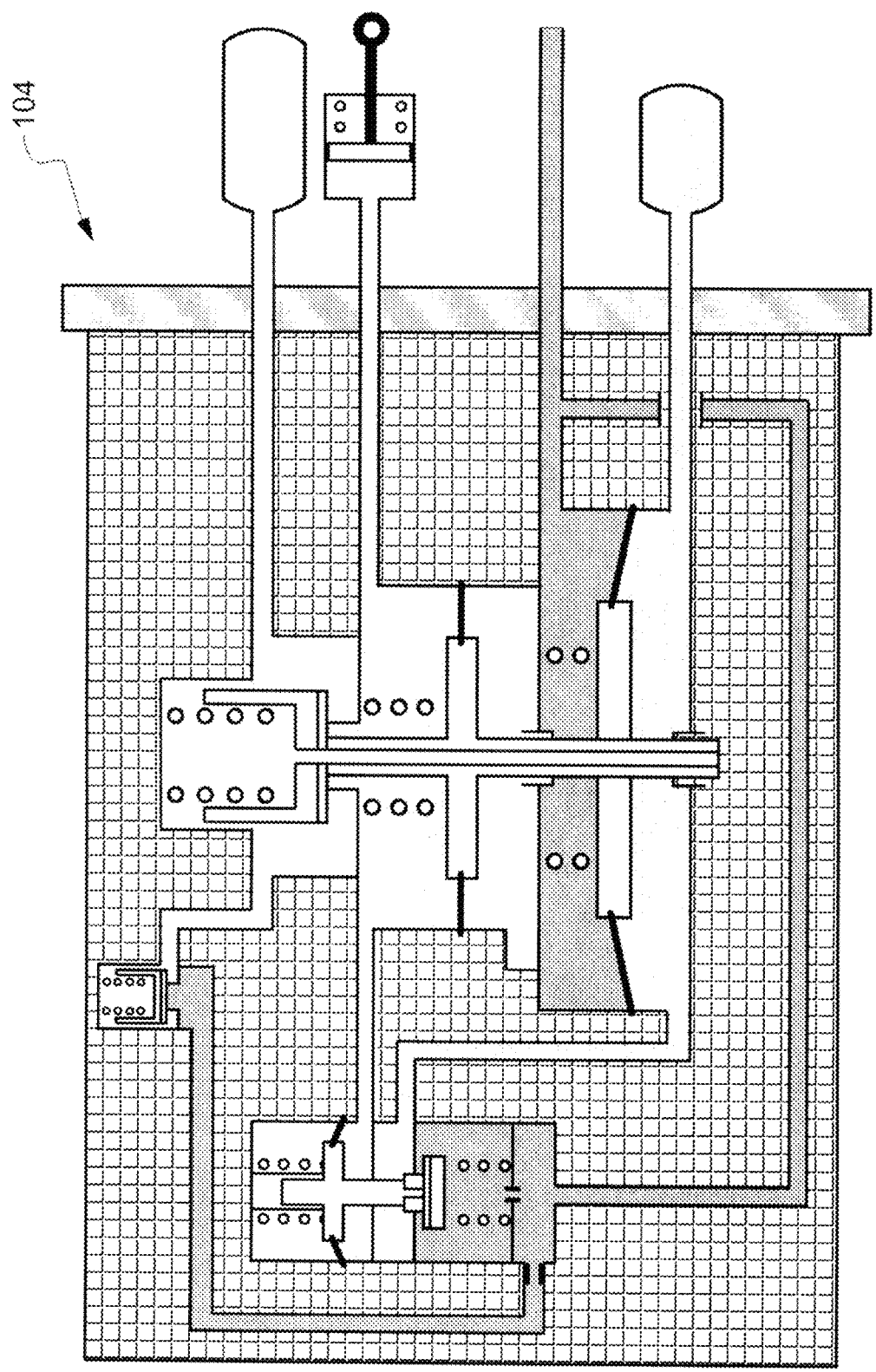
FIG. 3 schematically illustrates a distributor valve.
Figure 4:
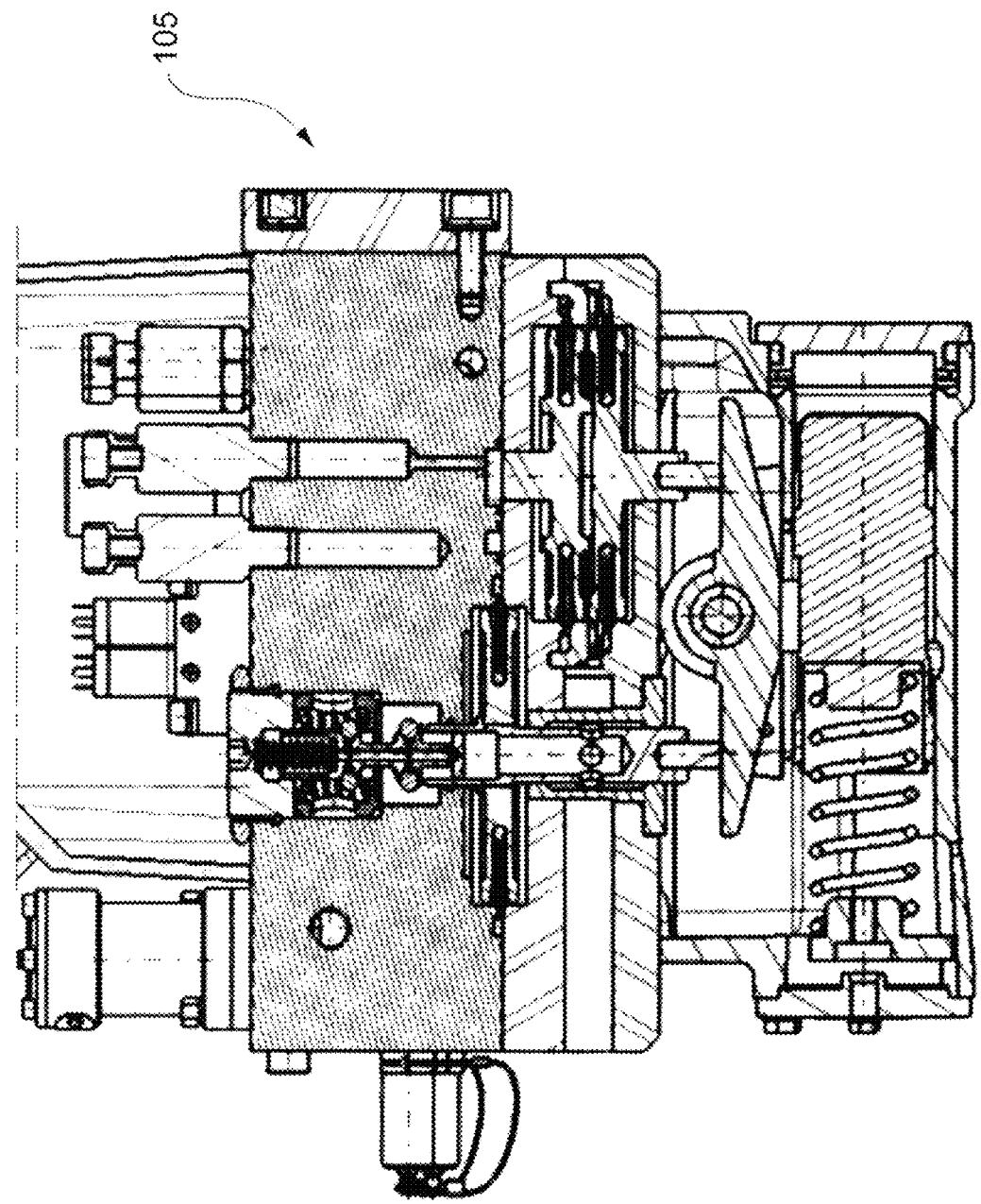
FIG. 4 illustrates the section of an empty-load valve.

The pressure value required for service braking is obtained by combining, for example, but not exclusively, said first service braking or deceleration request signal 530 and said first weight signal 522, by means of a suitable function known to the man skilled in the art, similar to what shown in FIG. 2B.

A second service braking or deceleration request signal 531, coming from a TCMS 532, can also be transmitted to the calculation submodule of a service braking pressure 508 from a communication submodule 509.

The communication submodule 509 manages all the communication protocols towards the train, for example, but not exclusively, towards the TCMS 532 and towards a traction system 533.

Other submodules included in the dashed block 510 may be present. For example, but not exclusively, Input/Output management submodules, for managing and storing diagnostic information 534 and display management, communication submodules for diagnostic tools, and other submodules not related to emergency braking normally known to the man skilled in the art.

A communication channel 536, of either the wired or wireless type, is used by the service braking module 507 and by the emergency braking module 501 to exchange information with each other.

The communication channel 536 can be either "point-to-point" or shared with other modules, not necessarily dedicated to vehicle braking functions. Said further modules are not shown in FIG. 5.

The communication channel 536 can for example consist of a bus.

The information, and in particular the service braking pressure signal 535, is transferred from the service braking module 507 to the emergency braking module 501, for example, but not exclusively, according to the black channel concept such as expressed in the European standard "EN50159: Railway applications. Communication, signalling and processing systems. Safety-related communication in transmission systems". The communication channel 536 can also be implemented by means of hardwired lines of the analog type, for example but not exclusively in voltage or current or PWM, or by digital coding on multiple wires.

In the emergency braking module 501, a calculation submodule of a first transfer function 502 receives at least one signal indicative of an emergency braking request.

In this embodiment, the at least one signal indicative of an emergency braking request is a pneumatic braking signal 520 indicating the control pressure of a braking system of the vehicle, for example, a suitably acquired pressure signal corresponding to the pressure value of the brake pipeline (already indicated with 101 in FIG. 1), whose range of values includes at least one value corresponding to an emergency braking.

The value corresponding to an emergency braking can for example be a value which exceeds a predetermined threshold. The term exceeds can be understood to be the case in which the value is greater than the predetermined threshold or the case in which the value is lower than the predetermined threshold.

The calculation submodule of a first transfer function 502 calculates the transfer function of the curve shown in FIG. 2A, functionally emulating a distributor valve 104, including the sub-functions known to the experts as control tank and related behaviors against the actions of overload and disposal.

The calculation submodule of a first transfer function 502 therefore supplies at its output a distribution valve pressure signal 521, whose virtual value can correspond to a pressure value between 0 bar and 3.8 bar according to the emulation of the distributor valve 104.

Said distributor valve braking pressure signal 521 is supplied in input to a calculation submodule of a second transfer function 503, together with a second vehicle weight signal 528 ("WEIGHT") corresponding to the value of the weight of the vehicle acquired.

The pressure signal of the brake pipeline and the second weight signal of the vehicle 528 are acquired according to processes SIL≥3, for example, but not exclusively, through redundant and mutually diagnosed channels and sensors.

In an alternative embodiment, the second weight signal of the vehicle 528 can be transmitted through the communication channel 536 to the braking or deceleration request submodule 508 which will use said second vehicle weight signal 528 instead of acquiring the first weight signal 522.

The calculation submodule of a second transfer function 503 calculates the transfer function of the curve shown in FIG. 2B, performing the emulation of the load-empty valve 105.

The output of the calculation submodule of a second transfer function 503 is an intermediate braking pressure signal indicative of an emergency braking 523 which represents the virtual value of the pneumatic braking pressure which should be sent to the brake cylinder, following a braking performed through the modulation of the brake pipeline pressure signals. The range of values that the brake pipeline pressure signal can take includes a value corresponding to the value of the emergency braking. Said value is preferably represented by the maximum value that can be reached by the pneumatic braking, that is by the intermediate braking pressure signal indicative of an emergency braking 523.

The two-input emergency braking pressure selection submodule 504 receives as input the intermediate braking pressure signal indicative of an emergency braking 523 produced by the calculation submodule of a second transfer function 503 and the pressure signal of service 535 corresponding to the service braking pressure value produced by the calculation submodule of a service braking pressure 508 inside the service braking module 507.

The two-input emergency braking pressure selection submodule 504 performs a selection function. In particular, the two-input emergency braking pressure selection submodule 504 propagates in output the virtual pressure signal corresponding to the service pressure signal 535 when the intermediate braking pressure signal indicative of an emergency braking 523 is lower at a predetermined threshold pressure value 529, and propagates in output the virtual pressure signal corresponding to the braking pressure signal indicative of an emergency braking 523 when the intermediate braking pressure signal indicative of an emergency braking 523 is equal to or greater than the predetermined threshold pressure value 529.

The predetermined threshold value 529 can be represented by a value available in the code of the emergency braking module 501.

The control signal of a braking pressure 524 is then propagated to a pressure control submodule 505 which provides to manage an electro-pneumatic actuator 506 through appropriate bi-directional electrical signals 525, transforming the control signal of a braking pressure 524 in input to module 505 in real pressure in input to the brake cylinder 527.

One skilled in the art is aware of the additional elements typical of a railway braking system, relating to the electro-pneumatic actuator 506, such as auxiliary tanks or anti-skid control systems, not shown in FIG. 5 since they are not strictly related to the content of the present invention.

The proposed solution highlights the functional and decisional independence of the emergency braking module 501 from the service emergency braking module 507.

If the emergency braking module 501 is developed according to criteria SIL≥3, the probability that a request for pneumatic braking, including at least one signal indicative of an emergency braking request corresponding to the maximum value of the pneumatic braking, is not applied to the brake cylinder 527 is within the criteria normally accepted for an equivalent traditional pneumatic system, at lower costs and higher accuracy.

Furthermore, for any type of hardware or software failure that may occur in the service braking module 507, the two-input emergency braking pressure selection submodule 504 of the emergency braking module 501 will in any case privilege the emergency braking request, that is always bringing the global system into a safe condition.

This solution therefore allows the development of the service braking module 507 according to safety levels SIL≤2 as occurs in the prior art, without thereby increasing the development costs and recurring product costs, while maintaining functional performance unaltered.

Figure 6:
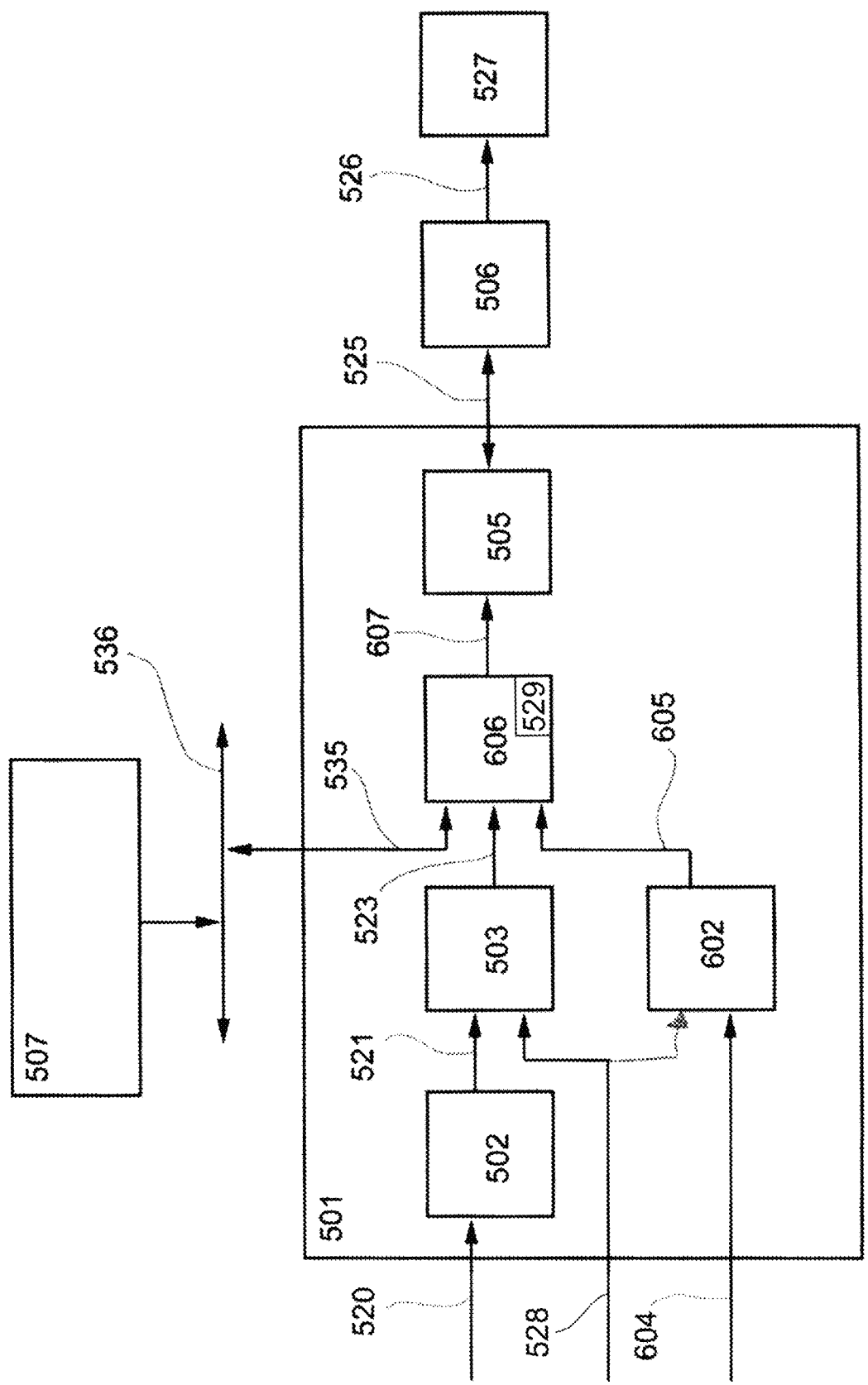
FIG. 6 illustrates a second embodiment of the emergency braking module.

FIG. 6 illustrates a second embodiment of the emergency braking module 501. The emergency braking module 501, developed in its entirety according to criteria SIL≥3, replicates at least part of what is described in the previous embodiment but also includes a pre-set emergency braking pressure assignment submodule 602. The pre-set emergency braking pressure assignment submodule 602 receives as input a second signal indicative of an emergency braking request. The second signal indicative of an emergency braking request, in this embodiment, is a signal 604 indicative of an emergency braking request coming for example, but not exclusively, from an emergency electric loop.

By emergency electric loop, for example, an electrical circuit is indicated which is able to detect an emergency braking condition and consequently generate a signal 604 indicating an emergency braking request.

In case of an emergency request by the signal 604 indicating an emergency braking request coming from the emergency electric loop, the pre-set emergency braking pressure assignment submodule 602 imposes a preset virtual pressure value to a respective emergency braking pressure signal 605.

Instead of the two-input emergency braking pressure selection submodule 504, a three-input emergency braking pressure selection submodule 606 is included which performs a selection function.

In particular, the three-input 606 emergency brake pressure selection submodule:

a) propagates in output the virtual pressure signal corresponding to the service pressure signal 535 when the greater between the emergency braking pressure signal 605 coming from the emergency electric loop and the intermediate braking pressure signal indicative of an emergency braking 523 is lower than a predetermined threshold pressure value 529; and b) propagates in output the greater between the emergency braking pressure signal 605 coming from the emergency electric loop and the intermediate braking pressure signal indicative of an emergency braking 523 when the greater between the emergency braking pressure signal 605 coming from the emergency electric loop and the intermediate braking pressure signal indicative of an emergency braking 523 is equal to or greater than the predetermined threshold pressure value 529.

The control signal of a braking pressure 607 coming from the three-input emergency braking pressure selection submodule 606 is then propagated to the pressure control submodule 505 which provides to manage the electro-pneumatic actuator 506 through appropriate bi-directional electrical signals 525, transforming the control signal of a virtual braking pressure 607 in input to module 505 in real pressure in input to the brake cylinder 527.

Various combinations can be created by means of the submodules of the emergency braking module 501, for example modulating the value of the emergency braking pressure signal 605 with the value of the vehicle weight signal 528 by means of a second of the calculation submodule of a second transfer function 503 before sending said value of the emergency braking pressure signal 605 to the three-input selection submodule 606.

In an embodiment not shown, the at least one signal indicative of an emergency braking request can be only one and be only the signal 604 indicative of an emergency braking request coming for example, but not exclusively, from an emergency electric loop.

In a further non-exclusive embodiment, the emergency braking module 501 may not use the brake pipeline pressure signal but only the emergency brake pressure signal 605, modulated or not by the weight signal 528.

Figure 7:
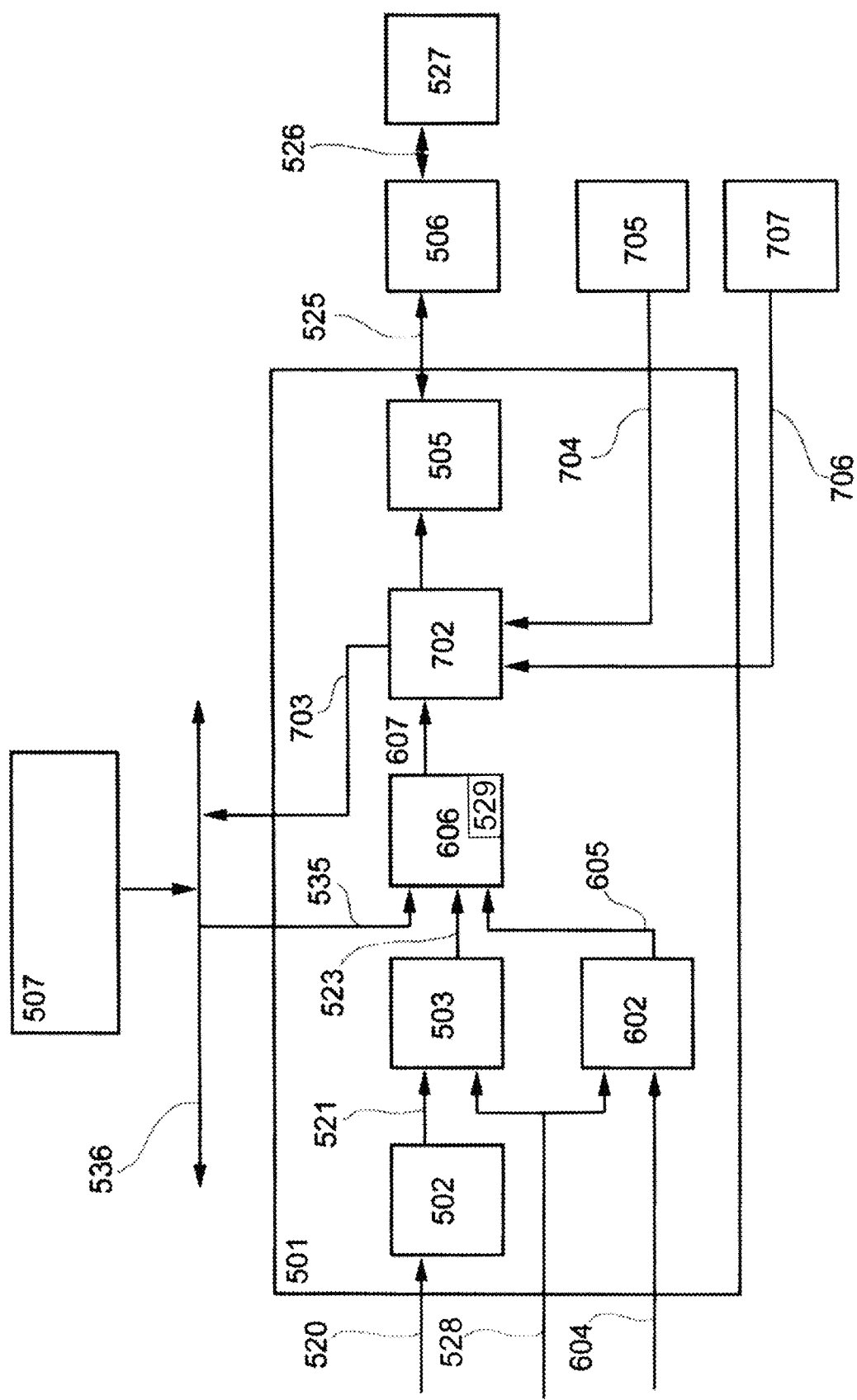
FIG. 7 illustrates a third embodiment of the emergency braking module.

An extension of what is described in FIG. 5 and FIG. 6 is shown in FIG. 7, in which an electrodynamic regenerative brake is used during emergency braking.

Traction control currently consists of inverters based on DSP (Digital Signal Processor) architectures not suitable for being developed according to criteria SIL≥3.

It is therefore impossible to entrust the emergency braking request directly to the traction systems unless the traction control is continuously monitored with a system SIL≥3 during emergency braking.

FIG. 7 illustrates a third embodiment of the emergency braking module 501, developed in its entirety according to criteria SIL≥3.

A decision submodule 702, also called "blending module", has the function of deciding whether the control signal of a braking pressure 607 coming from the three-input emergency braking pressure selection submodule 606 must be made pneumatically by means of the pressure control submodule 505 and the submodule of the electro-pneumatic actuator 506 or whether it must be suitably transformed into a braking torque request signal 703 and be sent to traction systems (not shown) directly through the communication channel 536 or propagated through the service braking module 507.

The decision submodule 702 receives continuous information on the value of the braking torque signal of the motors 704 detected by a suitable torque sensor means 705. The torque sensor means 705, consisting for example, but not exclusively, of transformers for measuring the currents generated by the motors in regeneration or of real torque transducers downstream of the motors, is developed according to criteria SIL≥3, for example through redundant and mutually diagnosed channels.

In this way, the complete path between the measurement of braking electromotive torque upstream of the torque sensor means 705 up to the decision on how to manage the braking torque of the decision submodule 702 is in accordance with the requirements SIL≥3.

In the presence of the braking pressure control signal 607 coming from the three-input emergency braking pressure selection submodule 606, the decision submodule 702 transmits the equivalent torque request to the traction system, measures the actual response through the torque sensor means 705, and if the resulting value is less than the required value, immediately compensates for the missing quantity by requesting it from the pressure control submodule 505 and the submodule of the electropneumatic actuator 506.

In other words, the emergency braking module 501 generates a braking torque requiring electrodynamic braking torque, continuously monitoring the electrodynamic braking torque by means of the torque sensor 705 and compensates for any partial or total deficiency of electrodynamic braking torque through the production of pneumatic braking torque.

The illustrated solution therefore ensures the management and application of emergency braking at level SIL≥3 partially or totally through the regenerative electrodynamic braking system, regardless of the fact that said electrodynamic regenerative braking system and the systems through which the submodule transmits the braking torque request signal 703 to the traction system, are developed according to criteria SIL≤2.

A further embodiment suitable for managing emergency braking in high speed conditions is also described.

Figure 8:
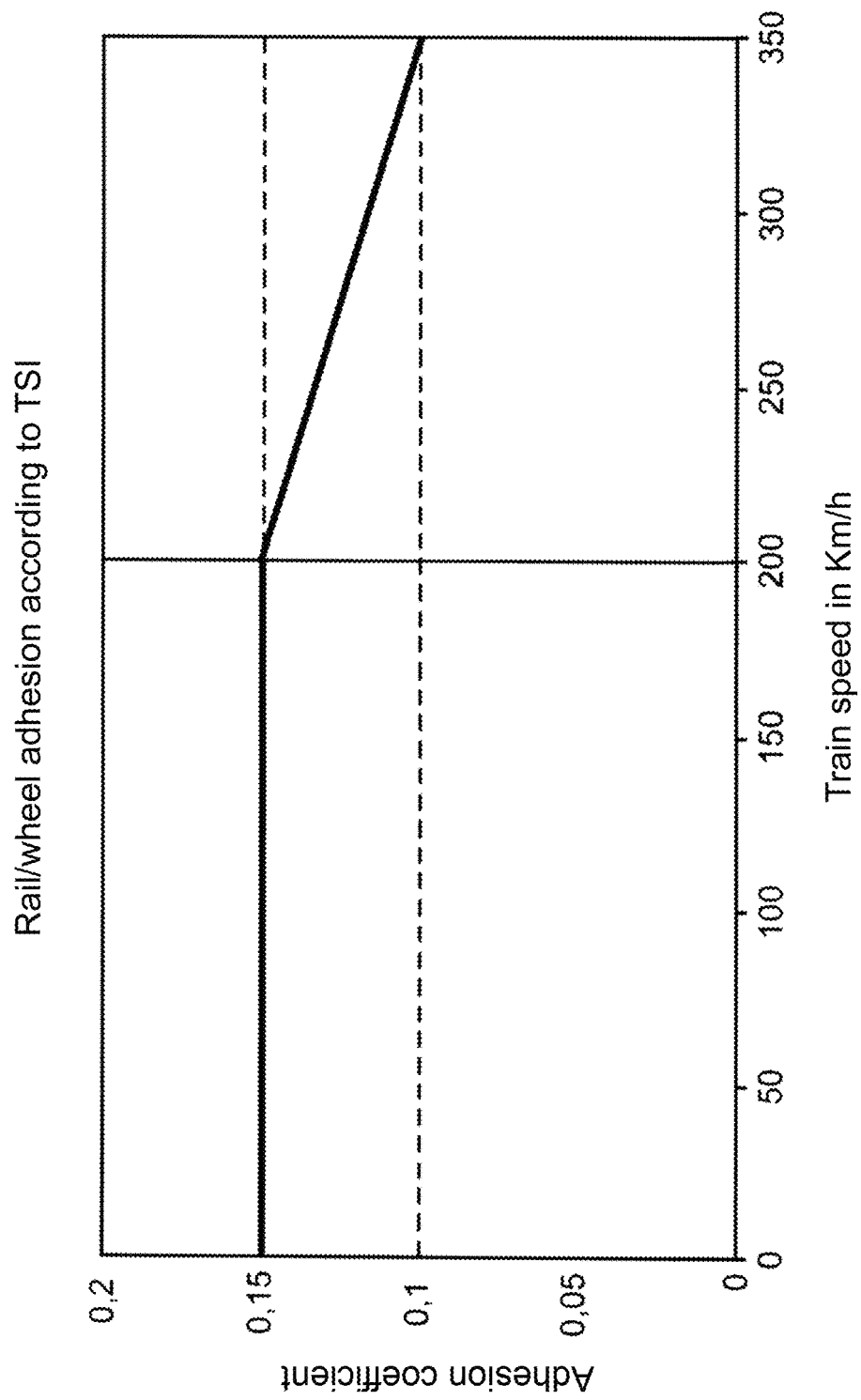
FIG. 8 qualitatively illustrates a curve of the level of adhesion between wheel and rail as a function of the adhesion coefficient and the vehicle speed.

It is known that the level of adhesion between wheel and rail decreases as the speed increases according to a law qualitatively stated in FIG. 8.

A speed signal of the vehicle 706, acquired through a channel SIL≥3, for example, but not exclusively, by means of speed sensor means 707 for rotating the redundant and mutually diagnosed wheels, is acquired by the decision submodule 702 which will limit the request for braking electrodynamic torque and/or braking pressure depending on the curve in FIG. 8 previously mapped in the decision submodule 702.

In this way, the emergency braking module 501 is able to correct a braking pressure when the grip available varies according to the speed of the vehicle.

A man skilled in the art is aware of the fact that the service braking module, in all its possible embodiments, can be implemented inside the TCMS device and communicate with the emergency braking module through the communication channel 536.

A man skilled in the art is also aware that the actuation system can be of the hydraulic type rather than the pneumatic type.

For example, but not necessarily, the service braking module 507 is made inside other systems on board the train.

Furthermore, the emergency braking module 501 can comprise more than one group including a pressure control submodule 505 and an electropneumatic actuator 506 for independently controlling several brake cylinders, according to the characteristic architecture of the vehicle.

In the previously described embodiments, the emergency braking module 501 can be designed in accordance with the requirements of EN50128 SIL≥3 and EN50129 SIL≥3, and the service braking module 507 can be developed in accordance with the requirements of EN50128 SIL≤2 and EN50129 SIL≤2.

In particular, the emergency braking module 501 can be made according to microprocessor-based redundant architectures, or by redundant programmable devices, for example but not exclusively FPGAs, or again by means of a microprocessor and an FPGA.

Various aspects and embodiments of an electronic braking control system of a railway vehicle according to the invention have been described. It is understood that each embodiment may be combined with any other embodiment. The invention, moreover, is not limited to the described embodiments, but may be varied within the scope defined by the appended claims.

The invention claimed is:

1. An electronic control system of a braking of a railway vehicle, wherein it includes an emergency braking module and a service braking module each including an electronic architecture arranged to generate a braking pressure value, said electronic architectures being independent and segregated from each other;
the service braking module being arranged to receive at least a deceleration or service braking request signal and to generate a respective service braking pressure signal;
the emergency braking module being connected to said service braking module through a communication channel for receiving said service braking pressure signal;
the emergency braking module being arranged to receive at least one signal indicative of an emergency braking request and to generate a respective intermediate braking pressure signal indicative of an emergency braking;
said emergency braking module being arranged to:

generate a braking pressure control signal corresponding to the service braking pressure signal, when a higher among the one or more intermediate braking pressure signals indicative of an emergency braking is lower than a predetermined threshold pressure value;
generate a braking pressure control signal corresponding to the higher brake signal among the one or more intermediate braking pressure signals indicative of an emergency braking, when the higher brake signal among the one or more intermediate signals braking pressure indicative of emergency braking is equal or higher than the predetermined threshold pressure value; and
convert said braking pressure control signal in a braking pressure by controlling an electropneumatic actuator.

2. The electronic control system of the braking of a railway vehicle according to claim 1, wherein the at least one signal indicative of an emergency braking request is a signal indicative of the pressure command of a braking system of the vehicle, of which at least an extreme value is indicative of an emergency braking condition.

3. The electronic control system of the braking of a railway vehicle according to claim 1, wherein the at least one signal indicative of an emergency braking request is a signal coming from an emergency electric loop.

4. The electronic control system of the braking of a railway vehicle according to claim 1, wherein the emergency braking module generates a braking torque request signal and sends the braking torque request signal to the communication channel.

5. The electronic control system of the braking of a railway vehicle according to claim 1, wherein the emergency braking module comprises a decision submodule configured to determine if a brake pressure is to be generated pneumatically or propagated through the service braking module.

6. The electronic control system of the braking of a railway vehicle according to claim 1, wherein the emergency braking module modulates at least one signal indicative of an emergency braking request with a weight signal of the vehicle.

7. The electronic control system of the braking of a railway vehicle according to claim 1, wherein the service braking module modulates the deceleration or service braking request signal with a weight signal of the vehicle.

8. The electronic control system of the braking of a railway vehicle according to claim 1, wherein a decision submodule of the emergency braking module is connected to a speed sensor.

9. The electronic control system of the braking of a railway vehicle according to claim 8, wherein the decision submodule of the emergency braking module is connected to a torque sensor, wherein the torque sensor detects a braking torque signal.

10. The electronic control system of the braking of a railway vehicle according to claim 9, wherein the decision submodule transmits a torque request to a traction system and measures an actual brake response via the torque sensor, and compensates for a missing quantity in the actual brake response by requesting it from a pressure control submodule and a submodule of the electropneumatic actuator.

11. The electronic control system of the braking of a railway vehicle according to claim 1, wherein said emergency braking module generates a braking torque by requiring electrodynamics braking torque, monitoring continuously the electrodynamics braking torque via a torque sensor, and compensates for a deficiency of torque via the production of pneumatic braking torque.

12. The electronic control system of the braking of a railway vehicle according to claim 1, wherein said emergency braking module corrects a braking pressure according to the adhesion available in function of the vehicle speed.

13. The electronic control system of the braking of a railway vehicle according to claim 1, wherein said communication channel is a wireless channel.

14. The electronic control system of the braking of a railway vehicle according to claim 1, wherein said communication channel is made by a bus.

15. The electronic control system of the braking of a railway vehicle according to claim 1, wherein said communication channel is made through hardwired row solutions comprising hardwired line of an analog type.

16. The electronic control system of the braking of a railway vehicle according to claim 1, further comprising a pressure control submodule arranged to manage one or more electropneumatic actuators.

17. The electronic control system of the braking of a railway vehicle according to claim 1, wherein the emergency braking module comprises a three-input emergency braking pressure selection submodule in communication with the communication channel, a pre-set emergency braking pressure assignment submodule of the emergency braking module, and a transfer function of the emergency braking module.

18. The electronic control system of the braking of a railway vehicle according to claim 1, wherein a control signal of a braking pressure from the three-input emergency braking pressure selection submodule is propagated to a pressure control submodule configured to manage the electropneumatic actuator through bi-directional electrical signals that transform the control signal of the braking pressure in input to a brake cylinder.

19. The electronic control system of the braking of a railway vehicle according to claim 1, wherein the emergency braking module is made according to an architecture including one or more microprocessors and one or more programmable device.

* * * * *